C. A. WYMORE.
AUTOMATIC FISH HOOK STRIKER.
APPLICATION FILED JUNE 10, 1914.
1,148,810.  Patented Aug. 3, 1915.
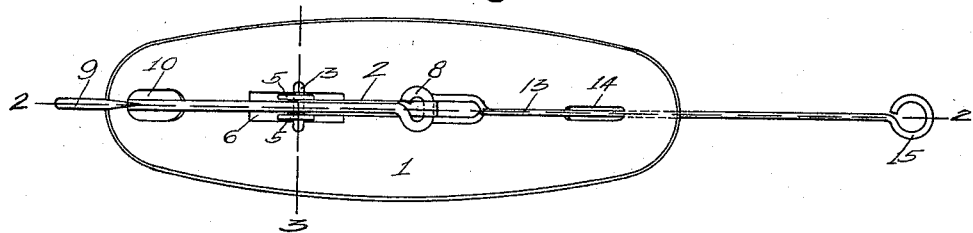
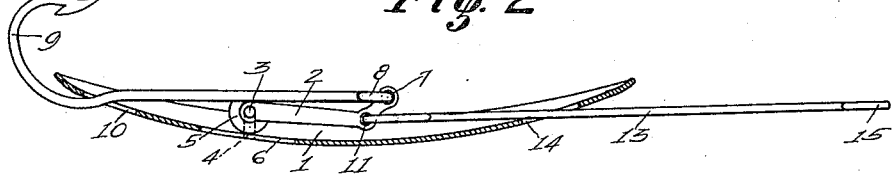
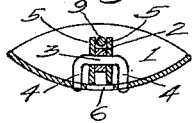
Witnesses,
Anne Hartenstein
Charles H. Wild
Inventor,
Cass A. Wymore,
By
Arthur L. Mack
Attorney.

UNITED STATES PATENT OFFICE.

CASS A. WYMORE, OF LONG BEACH, CALIFORNIA.

AUTOMATIC FISH-HOOK STRIKER.

1,148,810.  Specification of Letters Patent.  Patented Aug. 3, 1915.

Application filed June 10, 1914. Serial No. 844,372.

*To all whom it may concern:*

Be it known that I, CASS A. WYMORE, a citizen of the United States, residing at Long Beach, in the county of Los Angeles and State of California, have invented a new and useful Automatic Fish-Hook Striker, of which the following is a specification.

My invention relates to improvements in strikers for fish hooks as attached to spoons and the like; and the object of my invention is to provide a device which will eliminate the necessity for setting the striking mechanism after each strike, the restoration of the mechanism to normal being automatically accomplished when the tension on the line is released.

Other objects may appear in the detailed description following.

I attain this object by means of the mechanism illustrated in the accompanying drawings, in which—

Figure 1 is a plan of my device attached to a spoon; Fig. 2 is a sectional elevation on the line 2—2, Fig. 1; and Fig. 3 is a sectional elevation on the line 3—3, Fig. 1.

Similar characters of reference indicate the same parts throughout the specifications and the several views of the drawings.

1 is a spoon of a commonly used type, upon which I mount my striker mechanism which comprises a lever 2 pivoted at one end on a wire 3, the ends 4 of the wire being bent downwardly and riveted to the spoon 1 on opposite sides of the longitudinal center line. The wire 3 is provided with a collar 5 on each side of the lever 2 and the spoon 1 is provided with a slot 6 beneath the collars 5 and the end of the lever 2 to permit the free movement of the lever therein. The outer end of the lever 2 has a perforation 7 in which is secured the loop 8 on a common fish hook 9, the outer end of the hook extends through and is slidable in a suitable slot 10 in one end of the spoon 1, and the central portion of the hook is adapted to rest on the end of the lever 2 between the collars 5 when the mechanism is normal, and a lateral movement of the hook is thus prevented. The extreme end of the lever 2 to which the hook is secured is formed at an angle to the main body of the lever, and slightly below the perforation 7 is another perforation 11 in which is secured a loop 12 on a wire rod 13 which is slidable in the spoon 1 through a suitable slot 14 and the outer end of which is provided with a loop 15 by means of which a line may be secured to the rod 13.

When a line is attached to the rod 13 and is in tension, the mechanism will be held in normal position, as shown in Figs. 1 and 2, but when a fish attacks the bait on the hook 9, the hook will be jerked outwardly from the spoon, through the slot 10, the lever 2 will be turned on its fulcrum until its outer end rests on the floor of the spoon 1, and the rod 13 will be drawn inwardly through the slot 14. Thus the mechanism will yield to the attack on the bait until the movement of the hook and lever is stopped by the engagement of the lever with the floor of the spoon, and the instant that the hook is released by the fish the tension on the line will cause the restoration of the hook and lever to their normal position without withdrawing the line from the water and re-setting the lever, which is necessary in other types of striking devices.

It is obvious that my mechanism may be attached to any of the common types of spoons, or it may be made as a unit with any form of spoon such as are commonly used.

Having thus described my invention, what I claim as new and desire Letters Patent for, is:

1. A device of the character described including a spoon provided with a lever pivoted thereto and in normal parallel relation with the floor thereof, a hook normally parallel with and secured to said lever and protruding through a suitable slot in the floor of said spoon and movably disposed therein, and a link secured at one end to said lever and at the other to a line and slidably disposed in a slot in the opposite end of said spoon from said hook; the normal relation of said hook, spoon and lever being maintained when said line is taut, and said hook being movable outwardly from said spoon when said line is slack.

2. A device of the character described including a spoon provided with a lever pivotally mounted on the floor thereof, a hook longitudinally disposed in said spoon, pivotally secured to said lever and movable longitudinally of and outwardly from said spoon, guiding means for said hook, and line connecting means for said lever for normally maintaining said lever in a substantially horizontal position and said hook in its innermost position when the line is taut and for restoring said hook and lever to normal position after a strike, the movement of the hook and lever being accomplished when a strike takes place.

CASS A. WYMORE.

Witnesses:
ANNE HARTENSTEIN,
CHARLES H. WILD.

Copies of this patent may be obtained for five cents each, by addressing the "Commissioner of Patents, Washington, D. C."